United States Patent [19]

Briancon et al.

[11] Patent Number: 5,754,953
[45] Date of Patent: May 19, 1998

[54] METHOD AND APPARATUS FOR ASSISTING A USER TO ACTIVATE SERVICE FOR A SUBSCRIBER UNIT IN A MESSAGING SYSTEM

[75] Inventors: Alain C. Briancon, McKinney, Tex.; Vince Smoral, Hampton Cove, Ala.; Terence E. Sumner, Azle, Tex.

[73] Assignee: Motorola, Inc.

[21] Appl. No.: 719,189

[22] Filed: Sep. 24, 1996

[51] Int. Cl.⁶ .................................................. H04M 11/00
[52] U.S. Cl. .................................................. 455/418; 455/419
[58] Field of Search .................................. 455/418, 419, 455/420, 410, 411, 456, 457

[56] References Cited

U.S. PATENT DOCUMENTS

| | | | |
|---|---|---|---|
| 4,875,038 | 10/1989 | Siwiak et al. | 340/825.44 |
| 5,159,625 | 10/1992 | Zicker | 455/419 |
| 5,297,191 | 3/1994 | Gerszberg | 455/419 |
| 5,297,192 | 3/1994 | Gerzsberg | 455/419 |

*Primary Examiner*—Dwayne D. Bost
*Assistant Examiner*—Myron K. Wyche
*Attorney, Agent, or Firm*—R. Louis Breeden

[57] ABSTRACT

A memory (218) of a subscriber unit (122) is written (302) with a subscriber unit identification code (226) and an activation data package (228) including an activation home index (230), and at least one of a corresponding service provider name (232), service provider identification number (234), service provider operating frequency (236), and service provider contact information (238). The subscriber unit is programmed (304) to convey, to at least one of the user and the service provider, the subscriber unit identification code and selected portions of the activation data package and to make operational the activation home index, when the subscriber unit is in a service zone operated for the service provider and the service has not yet been activated.

15 Claims, 3 Drawing Sheets

5,754,953

METHOD AND APPARATUS FOR ASSISTING A USER TO ACTIVATE SERVICE FOR A SUBSCRIBER UNIT IN A MESSAGING SYSTEM

FIELD OF THE INVENTION

This invention relates in general to radio communication systems, and more specifically to a method and apparatus for assisting a user to activate service for a subscriber unit in a messaging system.

BACKGROUND OF THE INVENTION

Subscriber units used in radio messaging systems are programmed with a home index that corresponds to a service provider identifier transmitted by a messaging switch in the home location in which the subscriber unit resides. Increasingly, subscriber units are being distributed through a reseller who often does not know the home location to be used by the subscriber unit. This lack of knowledge renders it impossible for the reseller to program the home index into the subscriber unit.

A way around this problem is for the service provider to utilize an over-the-air (OTA) programming technique to program the home index into the subscriber unit. This technique, however, requires information about the subscriber unit and the home location that the user may not know, and further requires the subscriber unit to be in radio communication with a messaging switch in the home location, which necessitates a home index in the subscriber unit!

Thus, what is needed is a method and apparatus for assisting the user of the subscriber unit to activate service for the subscriber unit. The method and apparatus preferably should provide the information about the subscriber unit that will need to be communicated to the service provider, as well as providing a means, albeit temporary, for the subscriber unit to establish radio communication with a location served by the service provider to allow programming to take place.

SUMMARY OF THE INVENTION

An aspect of the present invention is a method for assisting a user of a subscriber unit to activate service for the subscriber unit in a messaging system operated for a service provider. The method comprises the step of writing into a memory of the subscriber unit a subscriber unit identification code and an activation data package comprising an activation home index, and at least one of a corresponding service provider name, service provider identification number, service provider operating frequency, and service provider contact information. The method further comprises the step of programming the subscriber unit to convey, to at least one of the user and the service provider, activation information comprising the subscriber unit identification code and predetermined portions of the activation data package and to make operational the activation home index, when the subscriber unit is in a service zone operated for the service provider and the service has not yet been activated.

Another aspect of the present invention is a subscriber unit for assisting a user of the subscriber unit to activate service for the subscriber unit in a messaging system operated for a service provider. The subscriber unit comprises an antenna for intercepting a message transmitted by the messaging system, and a receiver coupled to the antenna for receiving the message. The subscriber unit further comprises a processing system coupled to the receiver for processing the message and for controlling the subscriber unit, the processing system including a memory. Written into the memory is a subscriber unit identification code and an activation data package comprising an activation home index, and at least one of a corresponding service provider name, service provider identification number, service provider operating frequency, and service provider contact information. The processing system is programmed to convey, to at least one of the user and the service provider, activation information comprising the subscriber unit identification code and predetermined portions of the activation data package and to make operational the activation home index, when the subscriber unit is in a service zone operated for the service provider and the service has not yet been activated.

A third aspect of the present invention is a method for assisting a user of a subscriber unit to activate service for the subscriber unit in a messaging system operated for a service provider. The method comprises the step of writing into a memory of the subscriber unit a subscriber unit identification code and an activation data package comprising an activation home index, and a corresponding service provider identification number and service provider operating frequency. The method further comprises the step of programming the subscriber unit to make operational the activation home index and to convey, to at least one of the user and the service provider, a received service zone identification, when the subscriber unit is in a service zone operated for the service provider and the service has not yet been activated.

A fourth aspect of the present invention is a subscriber unit for assisting a user of the subscriber unit to activate service for the subscriber unit in a messaging system operated for a service provider. The subscriber unit comprises an antenna for intercepting a message transmitted by the messaging system, and a receiver coupled to the antenna for receiving the message. The subscriber unit further comprises a processing system coupled to the receiver for processing the message and for controlling the subscriber unit, the processing system including a memory. The memory is written with a subscriber unit identification code and an activation data package comprising an activation home index, and a corresponding service provider identification number and service provider operating frequency. The processing system is programmed to make operational the activation home index and to convey, to at least one of the user and the service provider, a received service zone identification, when the subscriber unit is in a service zone operated for the service provider and the service has not yet been activated.

DESCRIPTION OF THE PREFERRED EMBODIMENT

Figure 1:
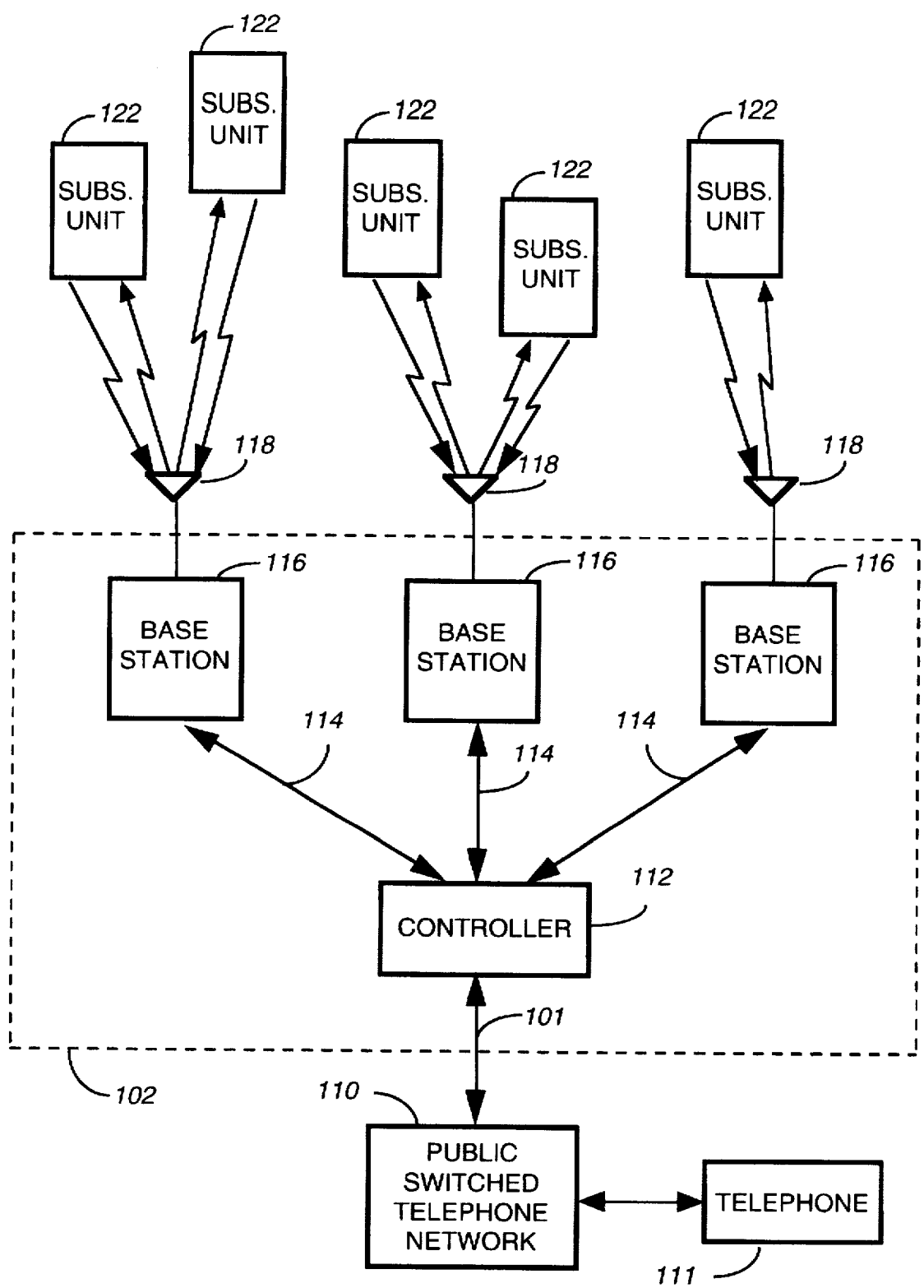
FIG. 1 is an electrical block diagram of a radio communication system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of subscriber units 122 preferably having acknowledge-back capability. The base stations 116 are used for communicating with the subscriber units 122 utilizing conventional radio frequency (RF) techniques, and are coupled by communication links 114 to the controller 112, which controls the base stations 116. The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receiver manufactured by Motorola, Inc. It will be appreciated that other similar hardware can be utilized as well for the controller 112 and the base stations 116.

Each of the base stations 116 transmits RF signals to the subscriber units 122 via a transceiver antenna 118. The base stations 116 each receive RF signals from the plurality of subscriber units 122 via the transceiver antenna 118. It will be appreciated that, alternatively, two separate antennas can be utilized for the transceiver antenna 118. The RF signals transmitted by the base stations 116 to the subscriber units 122 (outbound messages) comprise selective call addresses identifying the subscriber units 122, and data or voice messages originated by a caller. The RF signals transmitted by transmitters in the subscriber units 122 to the base stations 116 (inbound messages) comprise acknowledgments that include positive acknowledgments (ACKs), negative acknowledgments (NAKs), and unscheduled messages. An embodiment of an acknowledge-back messaging system is described in U.S. Pat. No. 4,875,038 issued Oct. 17, 1989 to Siwiak et al., which is hereby incorporated herein by reference. It will be appreciated that the present invention can be applied to one-way messaging systems (without acknowledge-back) as well.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112. It will be further appreciated that other sources, e.g., personal computers and other messaging systems, can be utilized as well for generating selective call message originations.

The protocol utilized for outbound and inbound messages is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other two-way and one-way messaging protocols can be used as well.

Figure 2:
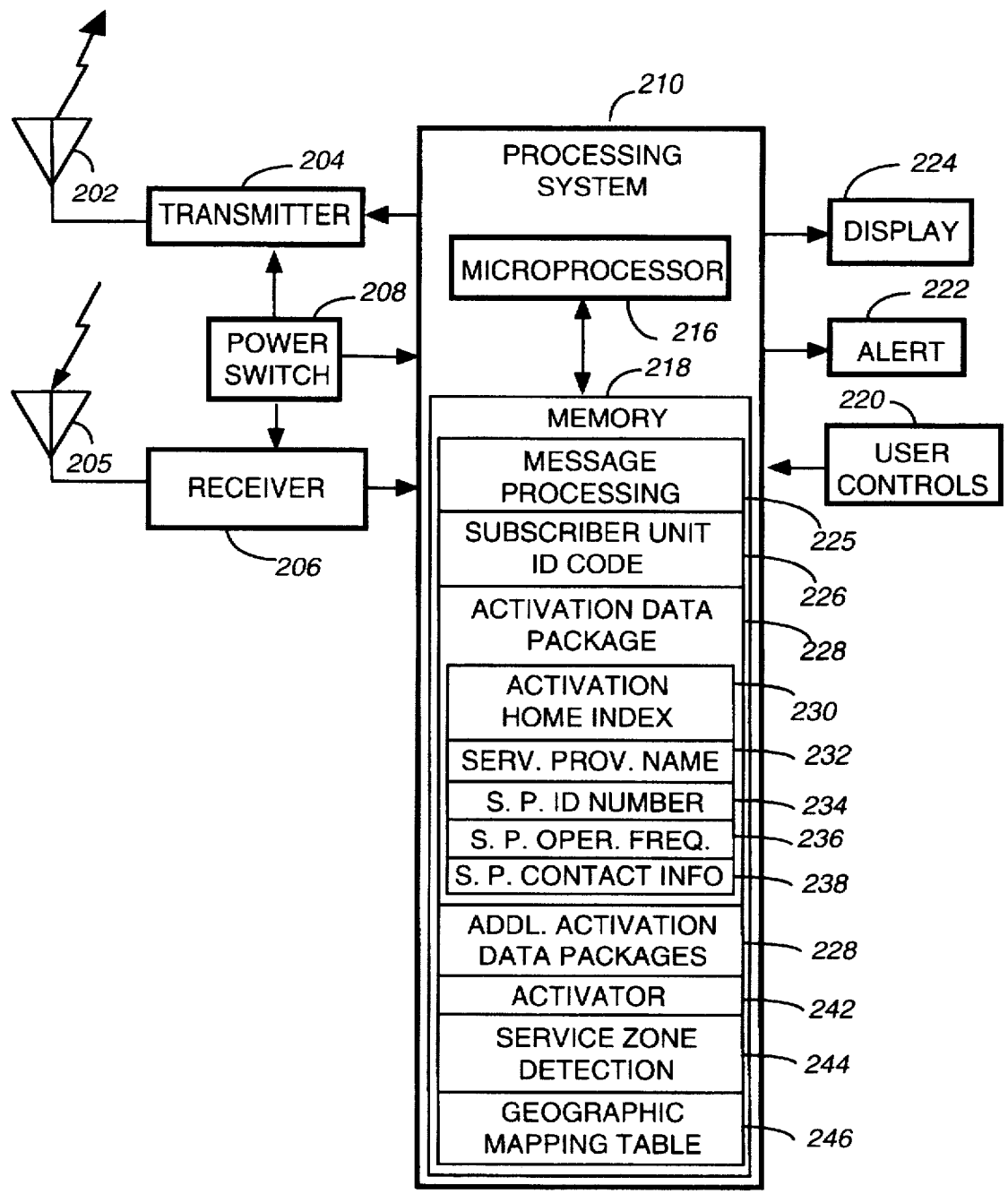
FIG. 2 is an electrical block diagram of a subscriber unit in accordance with the present invention.

FIG. 2 is an electrical block diagram of the subscriber unit 122 in accordance with the present invention. The subscriber unit 122 comprises a transmitter antenna 202 for transmitting radio frequency (RF) signals to the base stations 116, and a receiver antenna 205 for intercepting RF signals from the base stations 116. The transmitter antenna 202 is coupled to a conventional RF transmitter 204. Similarly, the receiver antenna 205 is coupled to a conventional RF receiver 206. It will be appreciated that, alternatively, the receiver 206 and transmitter 204 can be coupled to a single transceiver antenna, which transmits and intercepts RF signals to and from the base stations 116. It will be further appreciated that, alternatively, the subscriber unit 122 can be a one-way, receive only unit.

Radio signals received by the RF receiver 206 produce demodulated information at the output. The demodulated information is coupled to the input of a processing system 210 for directing operations of the subscriber unit 122, and for processing outbound messages. Similarly, inbound messages are processed by the processing system 210 and delivered to the RF transmitter 204 for transmission to controller 112 via the base stations 116. A conventional power switch 208, coupled to the processing system 210, controls the supply of power to the RF transmitter 204 and RF receiver 206, thereby providing a battery saving function.

To perform the necessary functions of the subscriber unit 122, the processing system 210 includes a microprocessor 216, and a memory 218. The microprocessor 216 is, for example, embodied by the M68HC08 microcontroller manufactured by Motorola, Inc. The memory 218 preferably includes a conventional electrically erasable programmable read-only memory (EEPROM) and a conventional random-access memory (RAM).

The microprocessor 216 is programmed by way of a message processing element 225 in the memory 218 to process a received outbound message. In addition, the processing system 210 creates and formats inbound acknowledgments, such as positive and negative acknowledgments (ACKs and NAKs), to the message. During outbound message processing, the processing system 210 samples the demodulated signal generated by the RF receiver 206. The processing system 210 then decodes an address in the demodulated data of the outbound message, compares the decoded address with a subscriber unit ID code 226 stored in the memory 218, and when a match is detected, continues to process the message. The microprocessor 210 then stores the message in the memory 218, and generates a call alerting signal to alert a user of the subscriber unit that a message has been received. The call alerting signal is directed to a conventional audible, tactile, or visual alerting device 222 for generating an audible or tactile call alerting signal.

By the use of appropriate functions provided by the user controls 220, the outbound message is recovered from the memory 218, and displayed on a display 224, e.g., a conventional liquid crystal display (LCD). Alternatively, when the message is a voice message, the message is played out on a conventional audio circuit (not shown in FIG. 2) that is included in the subscriber unit 122. Preferably, the subscriber unit 122 utilizes hardware similar to that of the Tenor™ and Tango™ personal messaging units manufactured by Motorola, Inc. of Schaumburg Ill. It will be appreciated that other similar components can be utilized as well for the subscriber unit 122.

In accordance with the present invention, the memory 218 also includes an activation data package 228. The activation data package 228 comprises an activation home index 230, which the processing system 210 makes operational when the subscriber unit is in a service zone operated for the service provider and the service has not yet been activated. The activation home index 230 preferably is a home index corresponding to a central accounting office designated to perform service activations for the service provider. Alternatively, the activation home index 230 can be a selected home index, e.g., zero, which is not used as a home address of any messaging switch, but is used only for service activation.

The activation data package 228 preferably further comprises a service provider name 232, service provider identification number 234, at least one service provider operating frequency 236, and service provider contact information 238, e.g., a telephone number or an Internet address. Preferably, the memory 218 further comprises additional activation data packages 228, so that the user can select one of several service providers by utilizing well-known scroll-and-select techniques between the display 224 and the user controls 220, thereby defining a selected activation data package, which is utilized for activating the service. In addition, the memory 218 preferably includes a activator 242 for cooperating with the microprocessor 216, the activation data package 228, and other elements of the memory 218 to convey the subscriber unit identification code 226 and predetermined portions of the activation data package 228 to at least one of the user and the service provider and to make operational the activation home index when the subscriber unit is in a service zone operated for the service provider and the service has not yet been activated. Whether portions of the above listed activation information are conveyed to the user or to the service provider depends upon the type of system, as will be explained further below. The memory 218 further preferably comprises a service zone detection element 244 for cooperating with the microprocessor 216 to determine the identity of the service zone with which the subscriber unit 122 is communicating. The identity is determined from a zone identifier included with the outbound message using well-known techniques. Preferably, the memory 218 also includes a geographic mapping table 246 which the processing system 210 accesses to map the identity of the service zone into a geographic area, e.g., Dallas, Tex., to convey to the user. It will be appreciated that, alternatively, the geographic mapping table 246 can be omitted and the identity of the service zone (a number) conveyed without translation. It will be further appreciated that, alternatively, selected elements of the activation data package 228, as well as the service zone detection element 244 can be omitted without departing from the scope and intent of the claimed invention.

Figure 3:
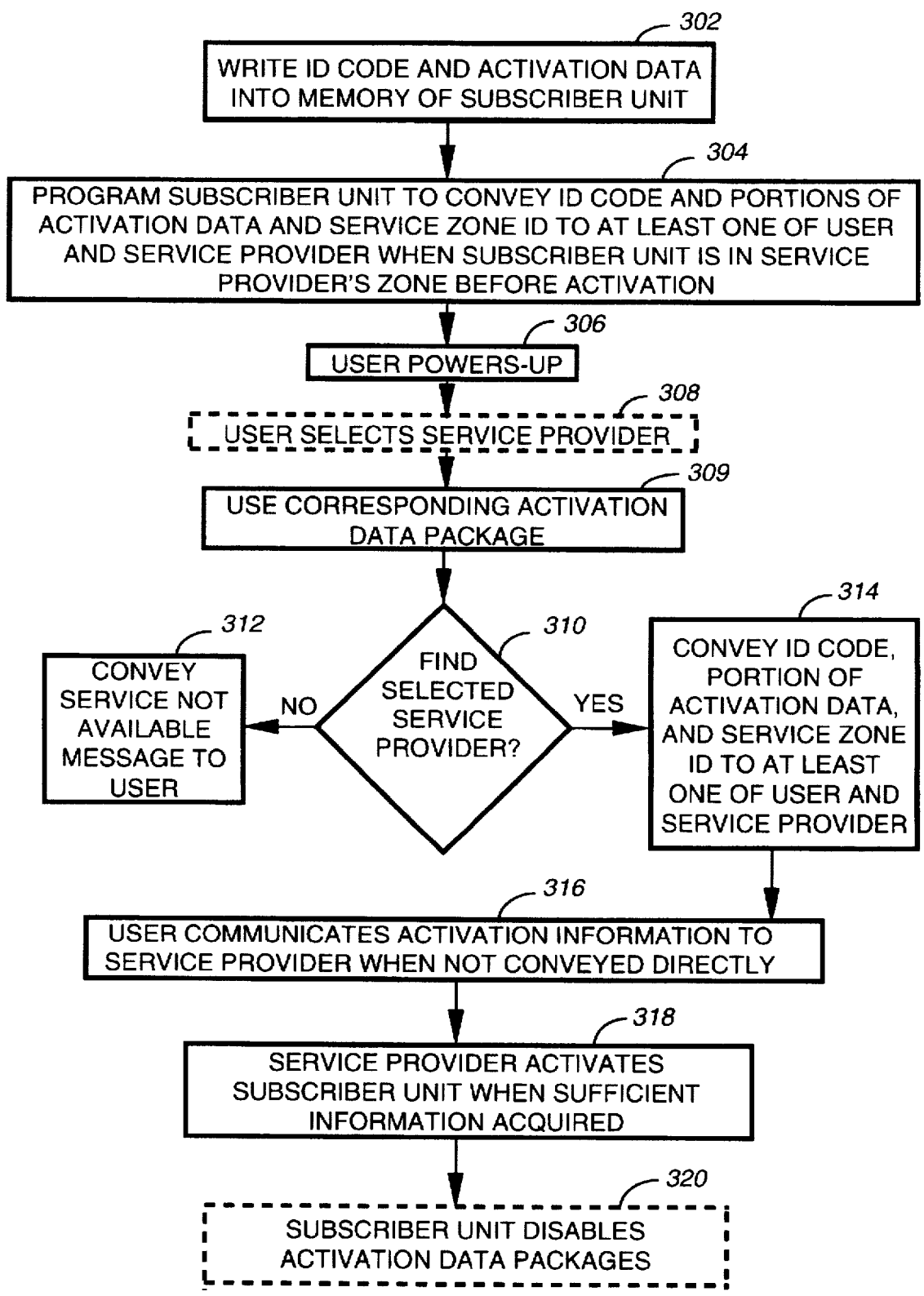
FIG. 3 is a flow chart depicting operation of the subscriber unit in accordance with the present invention.

FIG. 3 is a flow chart depicting operation of the subscriber unit in accordance with the present invention. The flow begins with writing 302 the subscriber unit identification code 226, the geographic mapping table 246, and preferably at least one activation data package 228 into the memory 218 of the subscriber unit 122. In addition, the subscriber unit 122 preferably is programmed 304 through the activator 242 and the service zone detection element 244 to convey a portion of the activation data and the received service zone ID to at least one of the user of the subscriber unit and the service provider when the subscriber unit 122 is operated in a zone serviced by the service provider and has not yet activated service. More specifically, in two-way systems the subscriber unit 122 preferably is programmed to convey directly to the service provider the subscriber unit identification code 226 and the identity of the service zone with which the subscriber unit 122 is communicating, via the inbound channel. Also in two-way systems the subscriber unit 122 preferably is programmed to convey to the user of the subscriber unit the service provider name 232, the service provider contact information, and the subscriber unit identification code 226. In one-way systems the subscriber unit 122 preferably is programmed to convey to the user of the subscriber unit the subscriber unit identification code 226, the identity of the service zone with which the subscriber unit 122 is communicating, the service provider name 232, and the service provider contact information.

Preferably, this information is displayed on the display 224. Alternatively, the information can be conveyed audibly. The user of the subscriber unit then communicates the subscriber unit identification code 226 and the identity of the service zone to the service provider via another communication means, e.g., via a telephone call.

Preferably the writing and programming steps 302, 304 take place during manufacture of the subscriber unit 122. Alternatively, either or both of these steps can be performed in the field, e.g., by a service shop or by the service provider. It will be appreciated that, as a further alternative, the subscriber unit can be programmed to tune to a predetermined "menu" channel when powered-up before service activation and to then write the at least one activation data package 228 into the memory 218 by downloading the at least one activation data package 228 from the menu channel, using well-known downloading techniques. It will be further appreciated that, alternatively, selected portions of the activation information, e.g., the identity of the service zone or the service provider contact information, can be omitted.

When the user of the subscriber unit is ready to activate service, the user then preferably selects 308 a service provider by utilizing well-known scroll-and-select techniques between the display 224 and the user controls 220. It will be appreciated that step 308 can be omitted when there is only one service provider written into the memory 218. When the user has selected a service provider (or if only one service provider was available), the processing system 210 then utilizes 309 the corresponding activation data package 228 for a subsequent service activation attempt. In preparation for the subsequent service activation attempt, the processing system 210 preferably copies the activation home index 230 to a more permanent storage location within the subscriber unit 122, e.g., elsewhere in the memory 218. In performing the service activation attempt, the subscriber unit 122 scans the service provider frequency (or frequencies) to locate a service provider ID matching the service provider identification number 234 of the selected service provider. In step 310 the processing system 210 checks whether the selected service provider has been found. If not, the processing system preferably displays a message indicating that service is not available from the selected service provider at the current location. If, on the other hand, the selected service provider has been found, then the processing system 210 preferably conveys the subscriber unit identification code, a portion of the activation data, and the identity of the service zone received. Portions of the preceding activation information are conveyed 314 to the user, the service provider, or both, depending on the type of system, as was explained herein above. For convenience, the processing system 210 preferably accesses the geographic mapping table 246 to map the identification of the service zone into a geographic area. Preferably, the portions of the activation information which are conveyed to the user are displayed on the display 224. Alternatively, the information can be conveyed to the user audibly. In a two-way system the portions of the activation information which are conveyed directly to the service provider are transmitted thereto via an inbound channel.

Next, the user of the subscriber unit contacts the service provider and communicates 316 activation information to the service provider. The activation information includes, for example, required information which the subscriber unit 122 was unable to transmit directly to the service provider, e.g., in the case of a one-way system, and personal information such as name, address, and credit information of the user.

When the service provider has acquired sufficient information to activate service for the subscriber unit 122, the service provider activates 318 service for the subscriber unit 122, preferably by utilizing well-known over-the-air programming techniques to replace the activation home index 230 with a true home index corresponding to the home location of the user, e.g., a home index in the currently received zone. It will be appreciated that, alternatively, the activation home index can be used as the true home index of the subscriber and thus the index is not changed. Once service has been activated, the processing system 210 preferably disables 320 the activation data package(s) 228 and the geographic mapping table 246. It will be appreciated that, alternatively, the activation data package(s) 228 and/or the geographic mapping table 246 can be left enabled for future use.

Thus, it should be apparent by now that the present invention provides a method and apparatus for assisting the user of the subscriber unit to activate service for the subscriber unit. The method and apparatus advantageously provides the information about the subscriber unit that will need to be communicated to the service provider, as well as providing a means, albeit temporary, for the subscriber unit to establish radio communication with a location served by the service provider to allow programming to take place.

What is claimed is:

1. A method for assisting a user of a subscriber unit to activate service for the subscriber unit in a messaging system operated for a service provider, comprising the steps of:

writing into a memory of the subscriber unit a subscriber unit identification code, a geographic mapping table, and an activation data package comprising an activation home index, and at least one of a corresponding service provider name, service provider identification number, service provider operating frequency, and service provider contact information; and programming the subscriber unit to convey, to at least one of the user and the service provider, activation information comprising the subscriber unit identification code and predetermined portions of the activation data package and to make operational the activation home index, when the subscriber unit is in a service zone operated for the service provider and the service has not yet been activated, and also to convey, to at least one of the user and the service provider, a geographic area corresponding to the service zone and determined from the geographic mapping table.

2. The method of claim 1, further comprising the steps of:

communicating from the user to the service provider the activation information conveyed by the subscriber unit when the activation information is not conveyed directly to the service provider by the subscriber unit; and activating, by the service provider, the service for the subscriber unit when sufficient information has been acquired.

3. The method of claim 1, wherein the programming step comprises the step of programming the subscriber unit to display the predetermined portions of the activation data package on a display of the subscriber unit.

4. The method of claim 1, wherein the programming step comprises the step of programming the subscriber unit to convey to the user the service provider name, and the service provider contact information.

5. The method of claim 1, wherein the writing step comprises the step of writing into the memory of the subscriber unit a plurality of activation data packages corresponding to a plurality of service providers, and wherein the programming step comprises programming the subscriber unit to allow the user to make a selection of a service provider and a corresponding activation data package prior to activating the service, thereby defining a selected activation data package, and wherein the selected activation data package is the activation data package utilized for activating the service.

6. The method of claim 5, further comprising the step of disabling the plurality of activation data packages after activating the service for the subscriber unit.

7. The method of claim 1, wherein the programming step comprises the step of arranging for the subscriber unit to convey an identity of the service zone to at least one of the user and the service provider when the activation home index is being used.

8. A subscriber unit for assisting a user of the subscriber unit to activate service for the subscriber unit in a messaging system operated for a service provider, comprising:

an antenna for intercepting a message transmitted by the messaging system;

a receiver coupled to the antenna for receiving the message; and a processing system coupled to the receiver for processing the message and for controlling the subscriber unit, the processing system comprising a memory, wherein written into the memory is a subscriber unit identification code, a geographic mapping table, and an activation data package comprising an activation home index, and at least one of a corresponding service provider name, service provider identification number, service provider operating frequency, and service provider contact information, and wherein the processing system is programmed to convey, to at least one of the user and the service provider, activation information comprising the subscriber unit identification code and predetermined portions of the activation data package and to make operational the activation home index, when the subscriber unit is in a service zone operated for the service provider and the service has not yet been activated, and also to convey, to at least one of the user and the service provider, a geographic area corresponding to the service zone and determined from the geographic mapping table.

9. The subscriber unit of claim 8, further comprising a display coupled to the processing system, wherein the processing system is further programmed to display a portion of the activation information on the display.

10. The subscriber unit of claim 8, wherein the processing system is further programmed to convey to the user the service provider name and the service provider contact information.

11. The subscriber unit of claim 8, wherein the memory is written with a plurality of activation data packages corresponding to a plurality of service providers, and wherein the processing system is further programmed to allow the user to make a selection of a service provider and a corresponding activation data package prior to activating the service, thereby defining a selected activation data package, and wherein the selected activation data package is the activation data package utilized for activating the service.

12. The subscriber unit of claim 11, wherein the processing system is further programmed to disable the plurality of activation data packages after activating the service for the subscriber unit.

13. The subscriber unit of claim 8, wherein the processing system is further programmed to convey an identity of the service zone to at least one of the user and the service provider when the activation home index is being used.

14. A method for assisting a user of a subscriber unit to activate service for the subscriber unit in a messaging system operated for a service provider, comprising the steps of:

writing into a memory of the subscriber unit a subscriber unit identification code, a geographic mapping table, and an activation data package comprising an activation home index, and a corresponding service provider identification number and service provider operating frequency; and programming the subscriber unit to make operational the activation home index and to convey, to at least one of the user and the service provider, a geographic area corresponding to a received service zone identification, when the subscriber unit is in a service zone operated for the service provider and the service has not yet been activated, the geographic area determined from the geographic mapping table.

15. A subscriber unit for assisting a user of the subscriber unit to activate service for the subscriber unit in a messaging system operated for a service provider, comprising:

an antenna for intercepting a message transmitted by the messaging system;

a receiver coupled to the antenna for receiving the message; and a processing system coupled to the receiver for processing the message and for controlling the subscriber unit, the processing system comprising a memory, wherein the memory is written with a subscriber unit identification code, a geographic mapping table, and an activation data package comprising an activation home index, and a corresponding service provider identification number and service provider operating frequency, and wherein the processing system is programmed to make operational the activation home index and to convey, to at least one of the user and the service provider, a geographic area corresponding to a received service zone identification, when the subscriber unit is in a service zone operated for the service provider and the service has not yet been activated, the geographic area determined from the geographic mapping table.

* * * * *